United States Patent [19]

Boenning

[11] Patent Number: 5,469,632

[45] Date of Patent: Nov. 28, 1995

[54] CAPACITIVE ANGLE SENSOR EMPLOYING A VERTICAL CANTILEVER BEAM

[75] Inventor: Robert A. Boenning, Baltimore, Md.

[73] Assignee: Westinghouse Electric Corp., Pittsburgh, Pa.

[21] Appl. No.: 225,272

[22] Filed: Apr. 8, 1994

[51] Int. Cl.⁶ .................................................. G01C 9/06
[52] U.S. Cl. ............................................. 33/366; 33/391
[58] Field of Search ...................... 33/366, 391; 73/518, 73/517 A, 517 R; 361/280

[56] References Cited

U.S. PATENT DOCUMENTS

| | | | |
|---|---|---|---|
| 3,083,469 | 4/1963 | Herbst | 33/366 |
| 4,077,132 | 3/1978 | Erkkson | 33/366 |
| 4,561,299 | 12/1985 | Orlando et al. | 33/366 |
| 4,713,890 | 12/1987 | Wells et al. | 33/366 |
| 5,006,487 | 4/1991 | Stokes | 73/517 R |
| 5,027,522 | 7/1991 | Cagan et al. | 33/366 |
| 5,092,174 | 3/1992 | Reidemeister et al. | 73/517 R |
| 5,209,117 | 5/1993 | Bennett | 361/280 |
| 5,228,341 | 7/1993 | Tsuchitani et al. | 361/280 |
| 5,243,861 | 9/1993 | Kloeck et al. | 361/280 |
| 5,259,118 | 11/1993 | Heger | 33/366 |

FOREIGN PATENT DOCUMENTS

| | | | |
|---|---|---|---|
| 0459723 | 12/1991 | European Pat. Off. | 73/517 R |
| 1597551 | 10/1990 | U.S.S.R. | 33/391 |
| 1620944 | 1/1991 | U.S.S.R. | 361/280 |
| 1654655 | 6/1991 | U.S.S.R. | 33/366 |

*Primary Examiner*—Thomas B. Will
*Attorney, Agent, or Firm*—Walter G. Sutcliff

[57] ABSTRACT

Capacitive angle sensor that changes capacitance as a function of angular rotation by employing a vertical cantilever beam capacitor.

6 Claims, 6 Drawing Sheets

TIMING DIAGRAM

CAPACITIVE ANGLE SENSOR EMPLOYING A VERTICAL CANTILEVER BEAM

BACKGROUND OF THE INVENTION

1. Field of the Invention

The present invention relates to "1 g" accelerometers as angle sensors for use in automotive, aircraft, ship, robotics and other applications. More particularly, the invention relates to a capacitive angle sensor that changes capacitance as a function of angular rotation by employing a vertical cantilever beam capacitor.

2. Description of the Related Art

Angle sensors can be used in a wide variety of applications. For example, angle sensors can be employed in automotive active suspensions to determine the angle of the control arm relative to the chassis, allowing calculation of the spacing of the wheel and chassis in real time. Angle sensors can be used as part of the attitude control mechanism in an aircraft or remotely piloted vehicle (RPV's), or as pitch and roll angle sensing devices on a ship. Angle sensing devices are also important in many robotics applications.

In these various angle sensing applications, it is necessary to accurately and continuously monitor the angle of the particular device in relation to some other device or reference point. Existing angle sensors employ a variety of techniques including: (1) a pendulum attached to the shaft of a potentiometer; (2) a curved tube containing an electrolyte that shunts resistance elements, connected as adjacent legs of a Wheatstone Bridge, as the tube is tilted; and (3) differential cooling of resistance elements by an enclosed gas, due to convection, that is a function of the tilt angle. All of these angle sensors are relatively large, mechanically complicated, and subject to various degrees of sensitivity and accuracy.

Therefore, a need exists for an accurate, sensitive, low cost and relatively simple angle sensor that can be adapted to perform in a wide variety of applications.

SUMMARY OF THE INVENTION

Accordingly, the present invention is directed to an apparatus for angle sensing using a capacitive angle sensor employing a vertical cantilever beam, substantially obviating one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof, as well as the appended drawings.

To achieve these and other advantages and in accordance with the purpose of the invention, as embodied and broadly described herein, the invention is a system for continuously measuring the angle of a device with respect to a reference point, as a function of the charge on a variable capacitor as a device is rotated. The variable capacitor angle sensor comprises a substrate; a fixed capacitor plate mounted on the substrate; a moving capacitor plate, having attached and free ends, spaced outwardly of the fixed plate; means for fixedly spacing the attached end of said moving plate from the fixed plate, the free end of the moving plate being operative to change the spacing of the free end relative to the fixed plate as the substrate rotates an angle $\phi$ about the reference axis; the fixed and moving plates operating as a variable capacitor; and means, coupled to the fixed capacitor plate, for measuring a change in charge on the variable capacitor as the substrate rotates an angle $\phi$ about the reference axis, the measuring means also being capable of outputting a voltage proportional to the charge on the variable capacitor.

In another aspect, the present invention comprises a substrate; a first fixed capacitor plate mounted on the substrate; a moving capacitor plate, having attached and free ends, spaced outwardly of the first fixed plate; a first means for fixedly spacing the attached end of the moving plate from the first fixed plate, the free end of the moving plate being operative to change the spacing of the free end relative to the first fixed plate as the substrate rotates an angle $\phi$ about the reference axis; the first fixed plate and moving plate operating as a first variable capacitor; a second fixed capacitor plate spaced outwardly of the moving plate; a second means for fixedly spacing the attached end of the moving plate from the second fixed plate, the free end of the moving plate being operative to change the spacing of the free end relative to the second fixed plate as the substrate rotates an angle $\phi$ about the reference axis; the second fixed plate and moving plate operating as a second variable capacitor; and means, coupled to the first fixed plate for measuring the charge on the first variable capacitor as the substrate rotates an angle $\phi$ about the reference axis, the measuring means further including means for outputting a voltage proportional to the charge on the first variable capacitor as a function of the ratio of the capacitance of the first capacitor to the capacitance of the second capacitor.

In yet another aspect, the present invention is a method for determining the rotation angle of a device with respect to a reference axis, the method comprising the steps of mounting a fixed capacitor plate on a substrate attached to the device; attaching a moving capacitor plate outwardly of the fixed capacitor; the fixed and moving plates operating as a variable capacitor; measuring a change in charge on the variable capacitor as the substrate rotates an angle $\phi$ about a reference axis; and outputting a voltage proportional to the charge on the variable capacitor.

It is to be understood that both the foregoing general description and the following detailed description are exemplary and explanatory only and are not restrictive of the invention, as claimed.

The accompanying drawings are included to provide a further understanding of the invention and are incorporated in and constitute a part of this specification, to illustrate the embodiments of the invention, and, together with the description, to serve to explain the principles of the invention.

DETAILED DESCRIPTION OF THE INVENTION

Reference will now be made in detail to an embodiment of the invention, an example of which is illustrated in the accompanying drawings. Wherever possible, the same reference numbers will be used throughout the drawings to refer to the same or like parts.

In accordance with the present invention, an apparatus is provided for detecting the charge on the capacitor as a function of the rotation angle.

Figure 1:
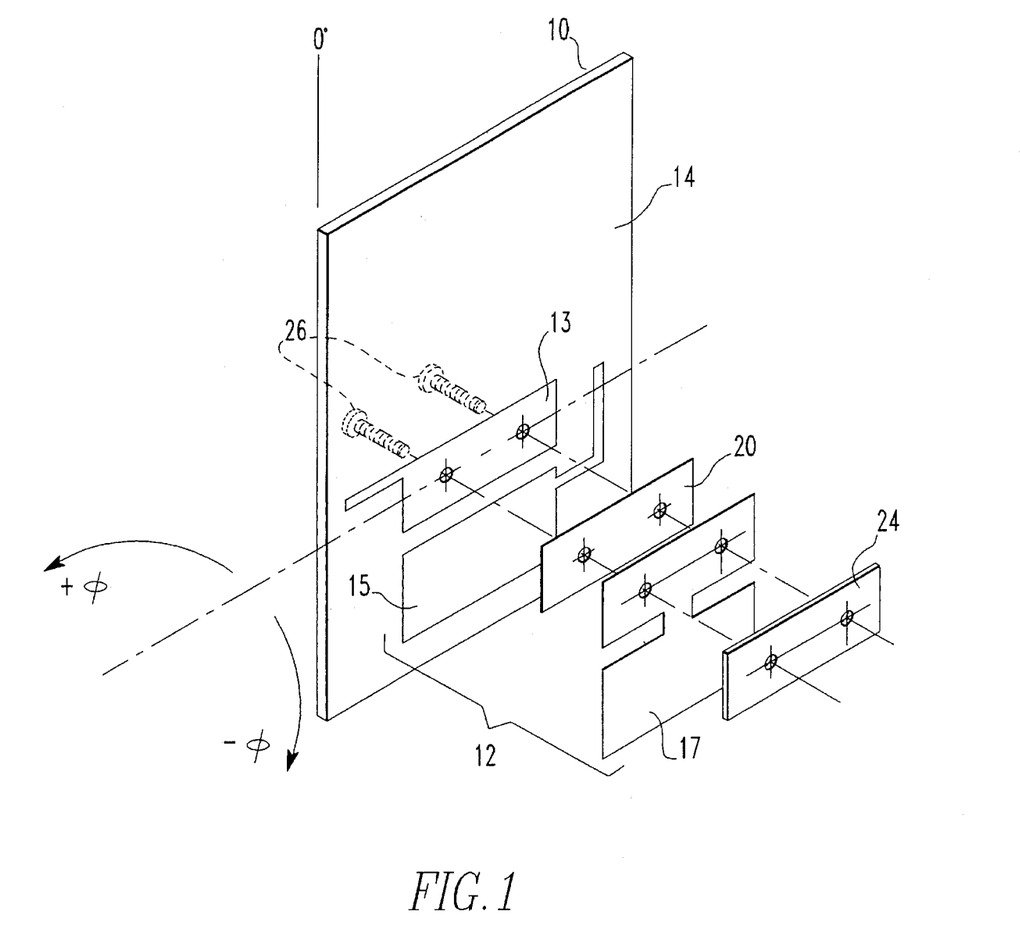
FIG. 1 is an exploded isometric view of an angle sensor made in accordance with the present invention where the moving plate changes its spacing relative to a fixed plate as a function of rotation angle.

An exemplary embodiment of the angle sensor apparatus of the present invention is shown in FIG. 1 and is designated generally as reference numeral 10. As embodied herein and referring to FIG. 1, the angle sensor 10 includes a fixed capacitor plate 15 mounted on substrate 14, a moving capacitor plate 17 adjacent, but spaced apart from, the fixed plate by a spacer 20, and a tapped plate 24 adjacent the moving plate to secure the moving plate to the substrate. The fixed plate 15 and moving plate 17 comprise variable capacitor 12. The details of the system are described below.

The apparatus of the present invention, as shown in FIG. 1, includes a substrate 14, which may be of any suitable well known type, but there is shown by way of example, a substrate composed of epoxy-glass. A fixed capacitor plate 15 is mounted on the substrate. The dimensions and composition of the fixed plate 15 are design choices dependent upon the application to which the angle sensor 10 is directed. Plate 13 is also mounted on the substrate 14, providing a connection means to the moving plate 17. As illustratively shown in FIG. 1 by way of example, the fixed capacitor plate 15 and connection plate 13 are composed of copper foil on the epoxy glass substrate. A spacer 20 is placed adjacent to, and in alignment with the connection plate 13. The spacer 20 has a thickness of 0.009 inches and is composed of aluminum, for example. The thickness of the spacer and its composition are design choices dependent on the application to which the angle sensor 10 is directed. A moving capacitor plate 17 is placed adjacent to the spacer 20. By way of example, the moving plate 17 in FIG. 1 is a cantilever 0.003 inch capacitor plate attached at one end to the substrate 14. The cantilever plate has desirable mechanical properties, including a medium modulus of elasticity, high linearity, low hysteresis, and low creep, as for example, a plate composed of beryllium copper. A tapped plate 24, with mounting screws 26, secures the moving plate 17 to the substrate 14.

As shown in FIG. 1, the fixed and moving plates are mounted in the Y-plane and rotation around the X-axis is shown as rotation angle φ. Positive and negative φ are determined with respect to zero deflection as oriented in FIG. 1.

In operation, the fixed plate 15 and moving plate 17 comprise a variable capacitor 12 as shown in FIG. 1. The moving plate 17 changes its spacing relative to the fixed plate 15 as the rotation angle φ changes. With reference to the orientation in FIG. 1, as the rotation angle φ is increased, the gravitational force acting on the moving plate will tend to decrease the spacing between the moving plate 17 and the fixed plate 15 of the capacitor. Conversely, as the rotation angle φ is decreased, the gravitational force acting on the moving plate will tend to increase the spacing between the moving plate and the fixed plate of the capacitor.

It is well known that the electric charge on a capacitor is proportional to the potential difference or voltage between the capacitive plates, as represented by the following formula:

$$Q=CE, \qquad (1)$$

where Q is the electric charge; C is the capacitance of the capacitor; and E is the voltage.

The capacitance C of the capacitor depends on the area of the two metal plates, A, the distance between the metal plates, S, and the dielectric constant corresponding to the dielectric material between the plates, ξ. The relationship is shown in the following formula:

$$C=\xi(A/S). \qquad (2)$$

In this embodiment, the area of the two metal surfaces A is constant for a given capacitor configuration, and the dielectric constant of the air between the plates, ξ, is essentially equal to one. Therefore, the change in capacitance C is inversely proportional to the distance between the metal plates S. As the rotation angle φ changes, the change in distance S between the fixed plate 15 and the moving plate 17 results in a change in capacitance on the variable capacitor 12.

Figure 2:
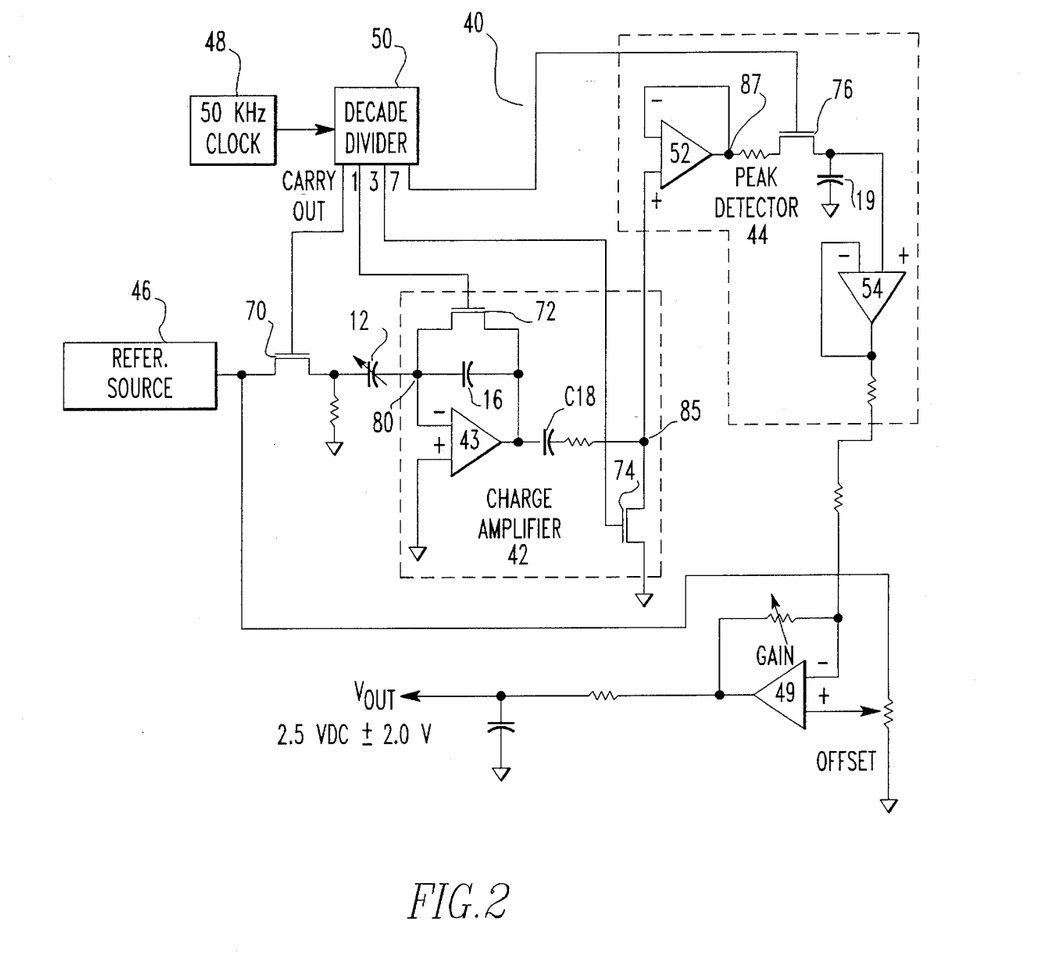
FIG. 2 is a diagrammatical representation of an angle sensor circuit made in accordance with the present invention for determining the change in capacitance with rotation angle.

The angle sensor circuit 40 depicted in FIG. 2 measures the charge on capacitor 12 as a result of the change in capacitance with rotation angle. As embodied herein, and in addition to the variable capacitor 12, the angle sensor circuit 40 includes a charge amplifier 42 coupled to the variable capacitor 12; a peak detector 44 coupled to the charge amplifier 42; a fixed voltage source 46 coupled to the variable capacitor 12; and a clock 48. The details of this angle sensor circuit 40 are described below.

Figure 7:
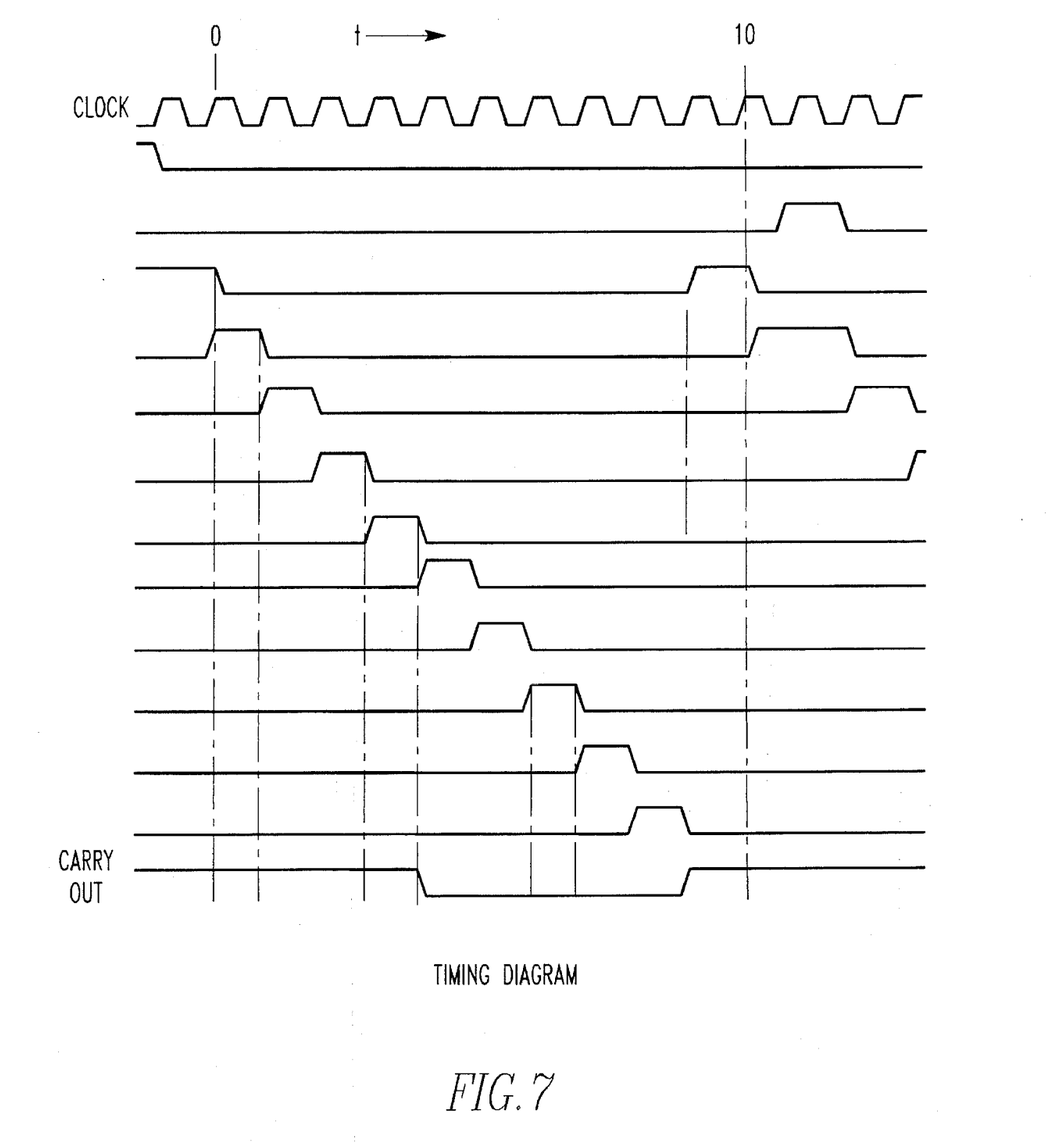
FIG. 7 is a timing diagram for the decade divider employed in the angle sensor circuit.

In operation, the output of a conventional 50 kHz clock 48, for example, is divided by the decade divider 50, to provide a 5 kHz sampling rate for the circuit. Referring to FIG. 7, the timing diagram for the circuit, and FIG. 2, the angle sensor circuit diagram, at t=0, the normally open switch 70 is closed by the carry-out output of the decade divider, allowing a regulated DC voltage, E, of 2.5 volts for example, to be applied to capacitor 12. Normally open switch 72 is also closed by the "1" output of the decade divider for a period of $2\times10^{-5}$ seconds (one clock cycle at 50 khz), shorting capacitor 16 and removing any charge.

Node 80, the "−" input of the op-amp 43, is at a "virtual ground" potential (0 volts) as a result of negative feedback, and capacitor 12 charges to a value of $Q_{12}$, equal to $C_{12}E$, where $C_{12}$ represents the capacitance of capacitor 12 and is a function of φ, the angle through which the capacitor has been rotated. At $t=2\times10^{-5}$ seconds, switch 72 opens, allowing capacitor 16 to charge to a value $Q_{16}=C_{16}e$ that balances the charge $C_{12}E$ on capacitor 12. Voltage e is the output voltage of op-amp 43. Since $C_{16}e=C_{12}E$, $$e=E(C_{12}/C_{16}).$$

E remains connected to capacitor 12 for $8\times10^{-5}$ seconds (4 clock cycles). Voltage e, therefore, is a function of $C_{12}$ during the sampling period of 3 clock cycles, i.e., $6\times10^{-5}$ seconds. Voltage e is then applied to the "+" input of voltage follower 52 of the peak detector 44 via capacitor 18. At $t=4\times10^{-5}$ seconds, switch 74 closes for one clock cycle, setting node 85 to 0 volts, and consequently, causing node 87 to also go to 0 volts, removing any charge on capacitor 19. During the next three clock cycles, $t=6\times10^{-5}$ seconds to $t=12\times10^{-5}$ seconds, nodes 85 and 87 rise to e, switch 74 having reopened. At $t=12\times10^{-5}$ seconds, switch 76 closes for one clock cycle, allowing capacitor 19 to charge to voltage e appearing at node 87. At $t=14\times10^{-5}$ seconds, switch 76 opens, disconnecting capacitor 19 from node 87 to prevent capacitor 19 from discharging back through the output impedance of voltage follower 52. Voltage e is then applied to voltage follower 54, that provides a high impedance coupling to operational amplifier 49, which provides gain to achieve the desired ±2 volts for $\phi=\pm15°$ and the +2.5 volts offset for $\phi=0°$ (see FIG. 3). After 10 clock cycles, the sequence repeats, providing a DC output that is updated every $2\times10^{-2}$ seconds as a function of the angle $\phi$.

Figure 3:
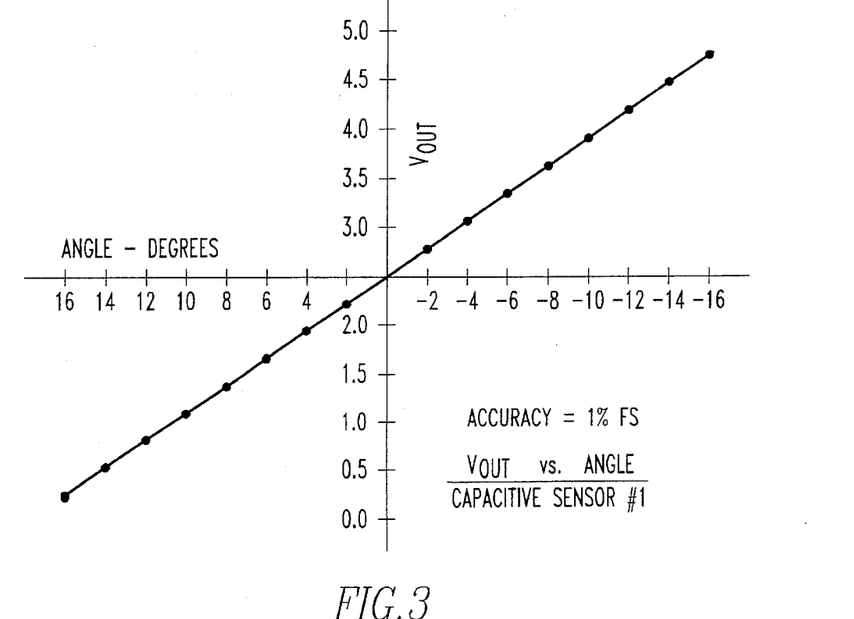
FIG. 3 is a graph of experimental data showing the voltage output, $V_{out}$, as a function of a rotation angle $\phi$ of $-15°$ to $+15°$.

In summary, when the angle sensor 10 is vertical as shown by reference angle 0° in FIG. 1, the output voltage of 2.5 volts equals the reference voltage as shown in FIG. 3. As the rotation angle $\phi$ changes, so does the relative spacing between the moving plate 17 and the fixed plate 15 of the variable capacitor 12. The change in spacing causes a corresponding change in the capacitance of the capacitor 12, which in turn alters the charge Q across the capacitor. The charge amplifier converts the change in the charge Q to a corresponding change in output voltage e.

Figure 4:
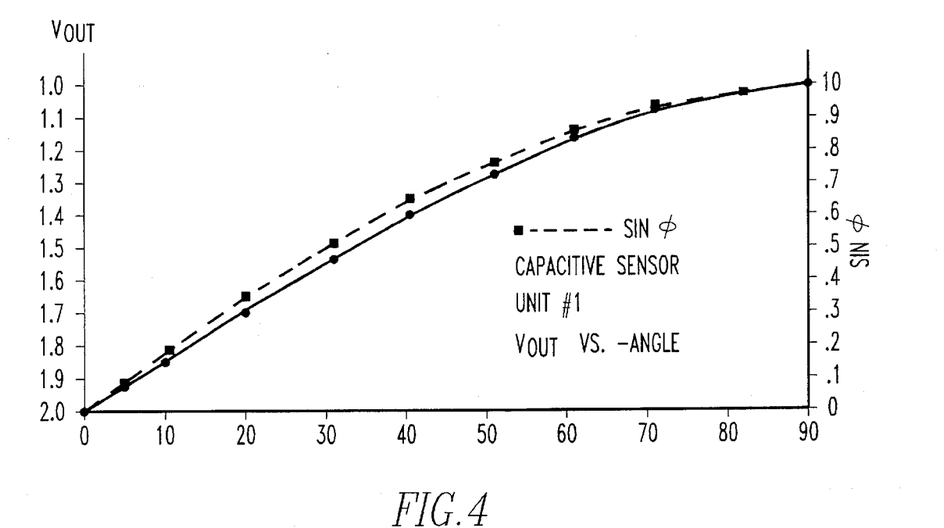
FIG. 4 is a graph showing voltage output, $V_{out}$, as a function of the rotation angle φ of 0°–90° and additionally comparing the sine of the rotation angle φ.

Since the moving plate 17 of capacitor 12 exhibits uniform bending as a result of its cantilever construction, the change in capacitance and the corresponding output voltage is essentially proportional to the sine of the rotation angle $\phi$ as shown in FIG. 4. FIG. 3 is a graph representing the voltage output of the angle sensor, $V_{out}$, as a function of rotation angle $\phi$ over the desired range of angular deflection of $-15°$ to $+15°$. It can be seen that over a range of $\pm15°$, $V_{out}$ is linear within 1%.

An additional embodiment of the present invention will now be described where like or similar parts are identified throughout the drawings by the same reference characters. This additional embodiment of the apparatus of the present invention is shown in FIG. 5 and is designated generally by reference numeral 100.

Figure 5:
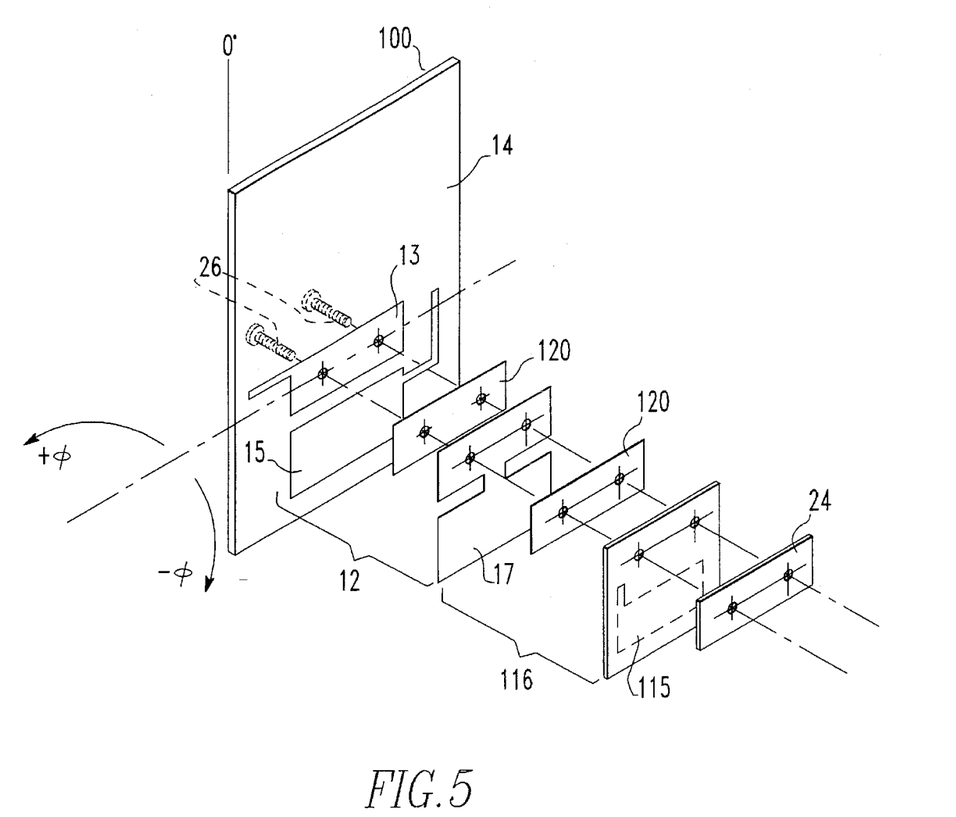
FIG. 5 is an exploded isometric view of an additional embodiment of the present invention employing a second fixed capacitor plate outwardly of the moving plate.

As embodied and shown in FIG. 5, the additional embodiment 100 includes a second fixed plate, 115, mounted adjacent to the moving plate 17. Between the second fixed plate 115 and moving plate 17 there is also a second spacer means 120. In this differential capacitor embodiment, as the spacing between the moving plate to one fixed plate is decreased, the spacing to the other fixed plate is increased. This alternate embodiment is more sensitive to changes in charge across the capacitors since a small positive change in capacitance to one of the fixed plates results in a corresponding negative change in the capacitance to the other fixed plate. The details of the system are described below.

The apparatus of the present invention, as shown in FIG. 5, includes an additional spacer means 120 spaced outwardly of the moving plate 17 and in alignment with the connection plate 13. The spacer 120 has a thickness of 0.009 inches and is composed of aluminum, for example. The thickness of the spacer and its composition are design choices dependent on the application to which the angle sensor 100 is directed. A second fixed capacitor plate 115 is located outwardly of the spacer 120. The dimensions and composition of the second fixed capacitor plate are design choices dependent upon the application to which the angle sensor 100 is directed. As illustratively shown in FIG. 5 by way of example, the second fixed capacitor plate is composed of copper foil on an epoxy glass substrate. The tapped plate 24 secures the second fixed capacitor plate 115 to the substrate 14 with mounting screws 26.

As shown in FIG. 5, the fixed plates and moving plate are mounted in the Y-plane and rotation around the X-axis is shown as rotation angle $\phi$. Positive and negative $\phi$ are determined with respect to zero deflection as oriented in FIG. 5.

In operation, the first fixed plate 15 and moving plate 17 comprise a first variable capacitor 12, and the second fixed plate 115 and moving plate 17 comprise a second variable capacitor 116. As the rotation angle $\phi$ changes, the free end of the moving plate 17 changes its spacing relative to the first fixed capacitor plate 15 in a first direction, while correspondingly changing its spacing relative to the second fixed capacitor plate 115 in a second opposite direction.

With reference to the orientation as shown in FIG. 5, as the rotation angle $\phi$ is increased, the gravitational force acting on the moving plate will tend to decrease the spacing between the moving plate 17 and fixed plate 15, while simultaneously increasing the spacing between the moving plate 17 and the fixed plate 115. Conversely, as the rotation angle $\phi$ is decreased, the gravitational force acting on the moving plate will tend to increase the spacing between the moving plate 17 and the fixed plate 15, while simultaneously decreasing the spacing between the moving plate 17 and the fixed plate 115.

Figure 6:
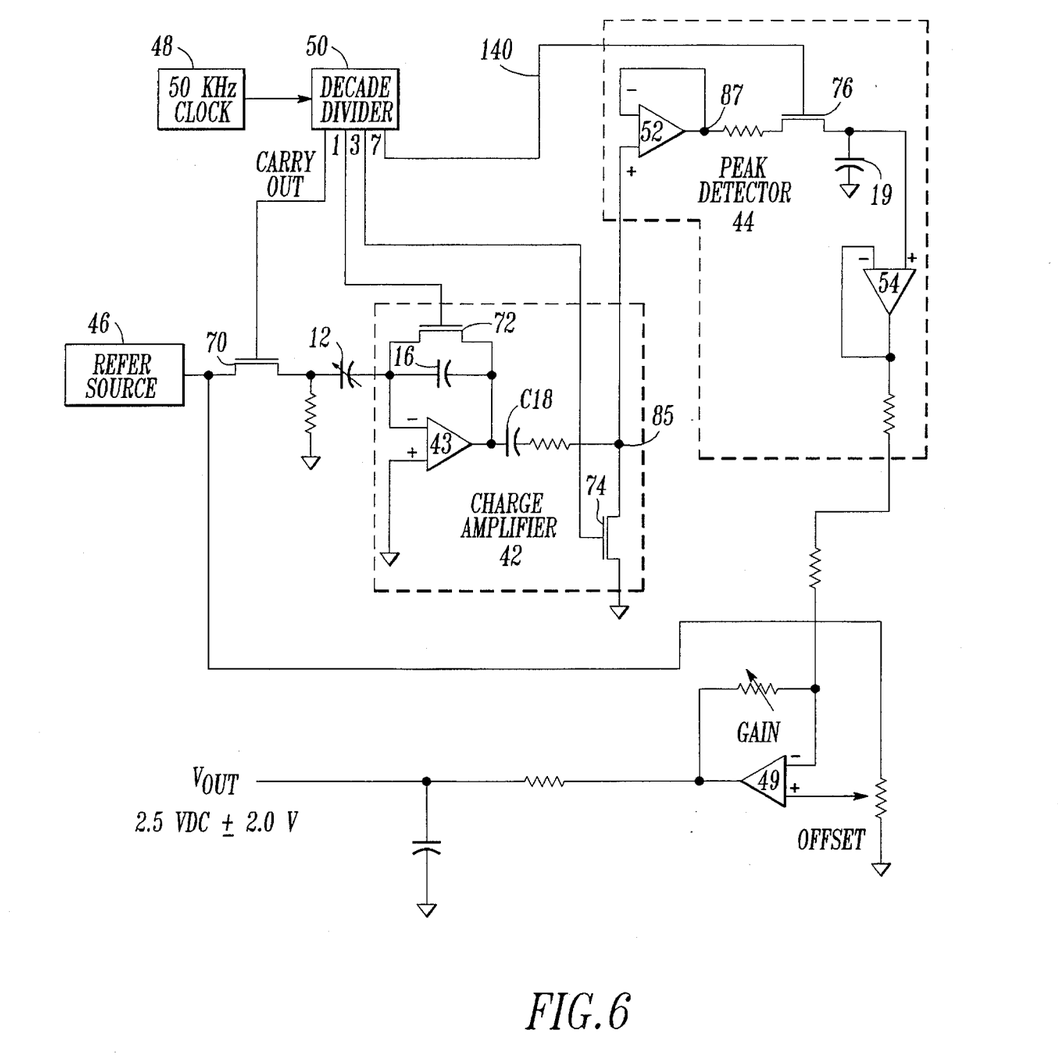
FIG. 6 is a diagrammatical representation of the angle sensor circuit of the additional embodiment.

The angle sensor circuit 140 depicted in FIG. 6 measures the change in charge across the capacitors as a function of the rotation angle. As embodied herein, and in addition to the differential capacitive elements described above, the angle sensor circuit 140 includes a charge amplifier 42 coupled to the variable capacitors 12 and 116, a peak detector 44 coupled to the charge amplifier 42; a voltage source 46 coupled to capacitor 12; and a clock 48.

The angle sensor circuit 140 in FIG. 6 operates in much the same manner as the angle sensor circuit 40 depicted in FIG. 2, except that output voltage e of circuit 140 is twice the output voltage e of circuit 40, for any angle $\phi$, provided $C_{12}=C_{116}$ at $\phi=0°$. This relationship results as a consequence of the fact that as the spacing between the moving plate 17 and fixed plate 15 increases, the corresponding spacing between the moving plate 17 and the second fixed plate 115, decreases. Thus assuming the initial capacitances are equal, the change in output voltage e is doubled for each change in capacitance. In this alternate circuit embodiment 140, the variable capacitor 12 operates in the same manner, its capacitance $C_{12}$ and charge $Q_{12}$ being variable dependent upon the relative spacing of the moving plate 17 from the first fixed plate 15 as discussed previously. The combination of the moving plate 17 and the second fixed plate 115 act as a second variable capacitor 116 as depicted in FIG. 5, its capacitance $C_{116}$ and charge $Q_{116}$ being variable dependent upon the relative spacing of the moving plate 17 from the second fixed plate 115.

In this alternate embodiment the charge amplifier 42 measures the charge, $Q_{12}$, on capacitor 12, by balancing the charge on capacitor 12 with an equal charge, $Q_{116}$, on capacitor 116 such that $$e=E(C_{12}/C_{116})$$

It will be apparent to those skilled in the art that various modifications and variations can be made in the system and method of the present invention without departing from the spirit or scope of the invention. Thus, it is intended that the present invention cover the modifications and variations of this invention provided they come within the scope of the appended claims and their equivalents.

I claim:

1. An angle sensor for determining the rotation angle of a device with respect to a reference axis, said angle sensor comprising:

a planar insulating substrate the plane of which defines the reference axis;

a first conductive film disposed on a first portion of the substrate to serve as a fixed capacitor plate;

a second conductive film disposed on a second portion of the substrate and spaced from and above the first conductive film;

a thin planar conductive spacer means aligned with and in overlaying conductive contact with the second conductive film;

a conductive cantilever member including a fixed portion which is aligned with and in overlaying fixed conductive contact with said conductive spacer means and said second conductive film disposed on the substrate, and a movable free end portion being aligned with but spaced from said first film to comprise a variable capacitor;

means for fixedly attaching said fixed portion of said conductive cantilever member to said planar conductive spacer means and thereby to said second conductive film, with said movable free end portion of said conductive cantilever member being movable to change the spacing between said movable free end portion and said first conductive film as the substrate rotates an angle $\phi$ about said reference axis;

means, electrically coupled to said first conductive film serving as the fixed capacitor plate and to said conductive cantilever member the movable free end portion of which comprises the variable capacitor, for measuring a change in charge on the variable capacitor as said substrate rotates about the reference axis, said measuring means including means for outputting a voltage proportional to the charge on the variable capacitor.

2. The angle sensor recited in claim 1, further including a tapped plate spaced outwardly of said conductive cantilever member for fixedly attaching said conductive cantilever member to said planar insulating substrate.

3. The angle sensor recited in claim 1, wherein said means for measuring and outputting is a charge amplifier.

4. The angle sensor recited in claim 3, further including means, coupled to said charge amplifier, for sampling and holding the output voltage for ease of measurement.

5. The angle sensor recited in claim 4, wherein said means for sampling and holding is a peak detector.

6. The angle sensor set forth in claim 1, including an outwardly spaced thin planar conductive spacer means aligned with the fixed portion of the conductive cantilever member on the side of said member opposite from the said other thin planar conductive spacer means, and a planar insulating substrate disposed outwardly from and disposed parallel to the outwardly spaced spacer means and having a third conductive film disposed fixedly thereon and aligned with and spaced from the movable free end portion of said conductive cantilever member to comprise a second variable capacitor which is electrically coupled to said means for measuring a change in charge on the variable capacitors.

* * * * *